Feb. 1, 1955 A. U. BRYANT 2,700,983
FLUID PRESSURE REGULATOR
Filed March 4, 1952 2 Sheets-Sheet 1
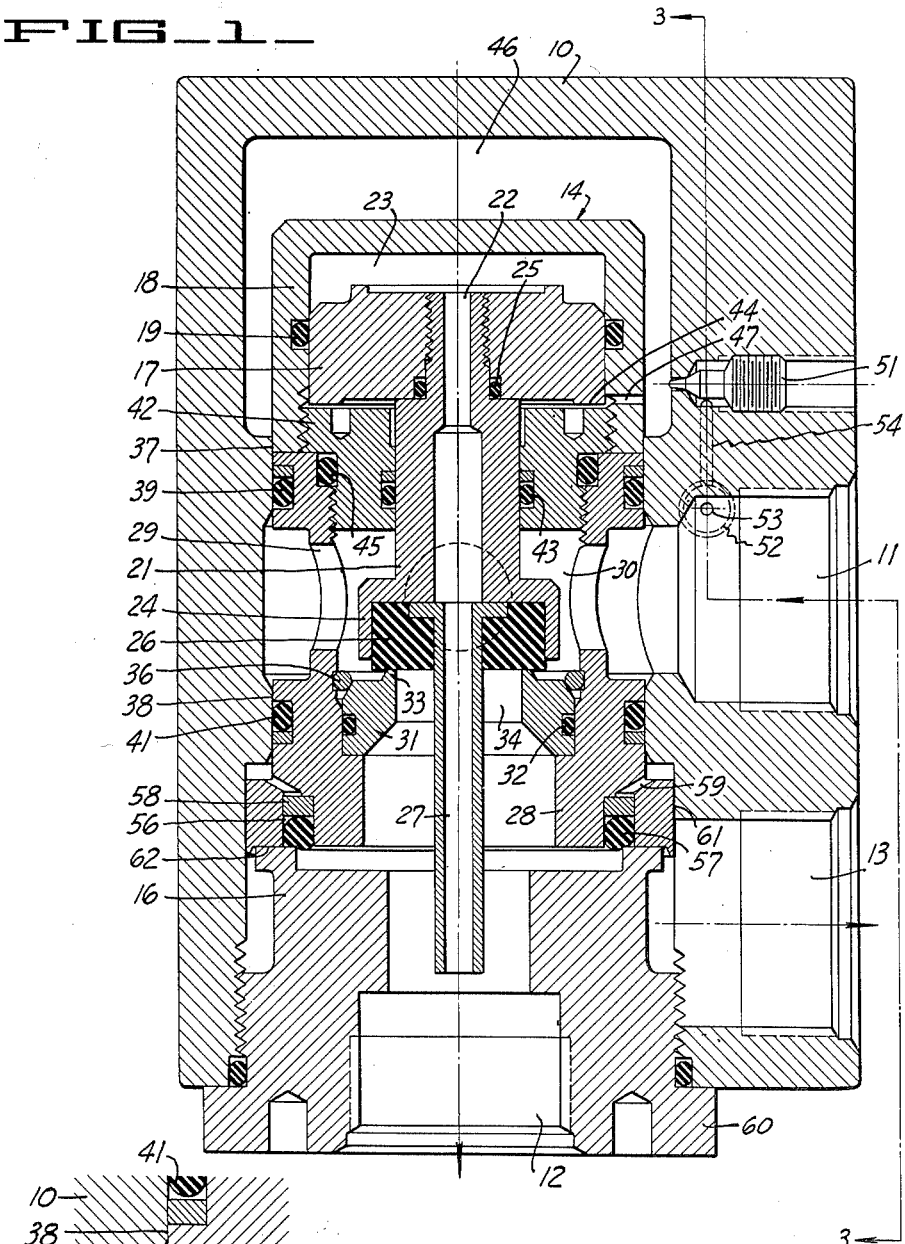
FIG_1_
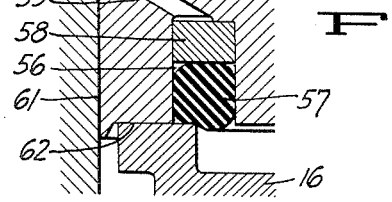
FIG_2_
INVENTOR.
Austin U. Bryant
BY
ATTORNEYS Feb. 1, 1955 A. U. BRYANT 2,700,983
FLUID PRESSURE REGULATOR
Filed March 4, 1952 2 Sheets-Sheet 2
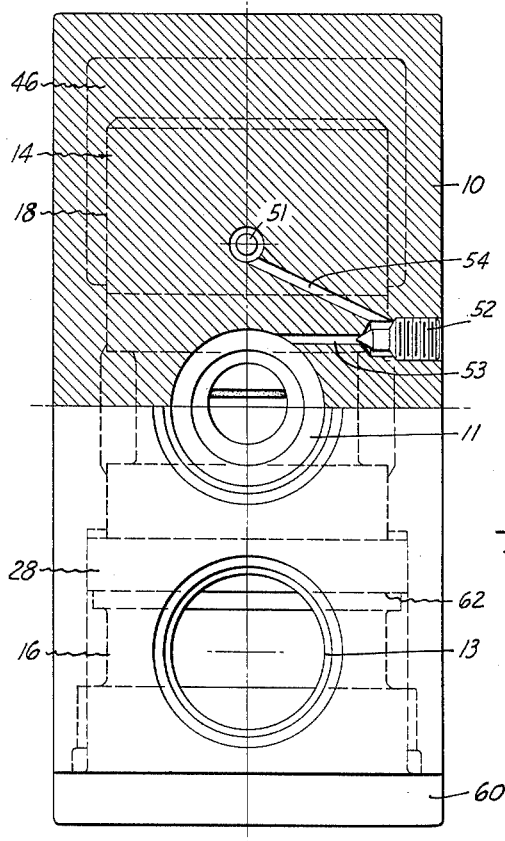
FIG_3_
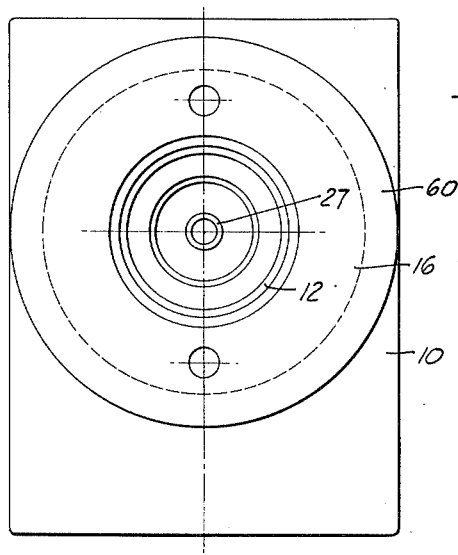
FIG_4_
INVENTOR.
Austin U. Bryant
BY
ATTORNEYS United States Patent Office 2,700,983
Patented Feb. 1, 1955

2,700,983
FLUID PRESSURE REGULATOR

Austin U. Bryant, Berkeley, Calif., assignor to Grove Valve and Regulator Company, Emeryville, Calif., a corporation of California Application March 4, 1952, Serial No. 274,750

5 Claims. (Cl. 137—505.11)

This invention relates generally to devices for automatically regulating flow of fluid, and particularly to devices capable of functioning both as a pressure reducing regulator and as a pressure relief valve.

For certain highly specialized services it is desirable to provide a device capable of operating on relatively high fluid pressure differentials, and which will function to maintain a desired low pressure while at the same time protecting the low pressure side from excessive pressures. As disclosed in copending application Serial No. 586,136, filed April 2, 1945, now Patent No. 2,627,870 granted February 10, 1953, it is possible to provide a device of this character which is capable of operating over a relatively wide pressure range, by utilizing automatic pressure reducing and relief devices of the gas loaded type. The construction disclosed in said copending application occupies considerable space such that it is not suitable for services where space and weight requirements are critical. When it is attempted to make the parts relatively small and of light weight, special factors are involved which greatly complicate the problem of obtaining satisfactory regulation.

In general it is an object of the present invention to provide an automatic device capable of functioning both as pressure reducing and a back pressure relief means and which can be made relatively small and light in weight for a given pressure and fluid flow capacity.

Another object of the invention is to provide a device of the above character in which the pressure reducing and relief valves are compactly incorporated in a single housing.

Another object of the invention is to provide a device of the above character in which the primary parts of the pressure reducing means are incorporated as an assembly unit which under certain conditions moves with respect to a stationary seat, to relieve excessive pressure upon the outflow side.

Additional objects of the invention will appear from the following description in which the preferred embodiment has been set forth in detail in conjunction with the accompanying drawing.

Referring to the drawing:

Figure 1 is a side elevational view in section illustrating a device incorporating the present invention.

Figure 2 is an enlarged cross-sectional detail showing the sealing means for pressure relief.

Figure 3 is a cross-sectional view taken along the line 3—3 of Figure 1.

Figure 4 is a bottom plan view of the device shown in Figure 1.

The device illustrated in the drawing consists of a body 10 which serves to house the working parts. The passages 11 and 12 are adapted for connection with associated piping, and form inflow and outflow connecting means.

Passage 13 forms a vent for the discharge of fluid to the atmosphere under conditions of excessive fluid pressure. Within the body there is an assembly unit 14 which forms a gas pressure loaded pressure reducing regulator. Under conditions of excessive outflow pressure, the entire unit 14 moves to open position with respect to the stationary seat 16, thus permitting outflow pressure from the regulator to escape to the vent 13.

The pressure reducing regulator unit consists of a piston 17, which is slidably fitted within the dome-like cylinder 18. Suitable fluid sealing means is provided between these parts, such as the resilient O ring 19. The piston is attached to one end of a stud 21, which extends through certain parts to be presently described, and is provided with a central passage 22 that communicates with the space 23 above the piston 17. The piston and stem are sealed with respect to each other by suitable means such as the resilient O ring 25. The free end of the stud 21 is provided with the flange or rim 24, which serves to encompass and retain the seat insert 26. This insert can be made of suitable material such as Teflon, synthetic rubber, or the like. An extension tube 27 is shown attached to stud 21, and extends through the seat insert 26. Tube 27 projects to a point where it communicates with the outflow passage 12.

A sleeve 28 is provided with ports 29 to establish recommunication between the space 30 surrounding the seat insert 26, and the inflow passage 11. A stationary metal seat ring 31 is carried by sleeve 28, and is sealed with respect to the same by suitable means such as the resilient O ring 32. The raised annular seating surface 33 formed on the ring 31 is adapted to engage the insert 26 and seal with respect to the same for closed position of the valve. It may be noted at this point that Figure 1 shows the parts of the valve in full closed position.

The seat ring 31 has the usual throat orifice 34 which communicates with the outflow passage 12, whereby for positions of the insert 26 other than full closed position, flow may occur from the inflow passage 11, through the throat orifice 34, to the outflow passage. The seat ring can be releasably held in operating position by suitable means such as the snap-in ring 36.

The sleeve is formed cylindrical, and is slidably fitted within the cylindrical portions 37 and 38 of the body 10. Fluid leakage between these parts is prevented by suitable means such as the resilient O rings 39 and 41.

The upper end of the sleeve 28 is attached to the cylinder 18. Thus a closure or barrier 42 is secured (as by threaded engagement) to the cylinder 18, and this barrier in turn is secured (as by threaded engagement) to the adjacent portion of sleeve 28. The barrier 42 is bored to slidably accommodate the stud 21. Leakage between these parts is likewise prevented by suitable means such as the resilient O ring 43. Also the sleeve is sealed with respect to the closure 42 by suitable means such as the resilient O ring 45.

The space 44 between the barrier 42 and the adjacent machined face of piston 17 is in restricted communication with the space 46 (the space surrounding the cylinder 18), by way of the small orifice 47. When the valve is fully closed the opposed faces of closure plug 42 and piston 17 are in close apposition, as for example a distance amounting to a small fraction of the total movement of the valve member in moving between fully closed and open positions.

Suitable means is provided for supplying gas under pressure to space 46, whereby gas loading is applied to the piston 17. In this instance a pair of needle valves 51 and 52 are provided, whereby gas can be admitted from the inflow passage 11 to space 46, or bled off to the atmosphere. When needle valve 51 is opened, some gas escapes past the same to the atmosphere. When valve 52 is opened in conjunction with opening of valve 51, some gas is bled through ducts 53 and 54 from the inflow passage 11, past the needle valve 51, and into the space 46. Thus the loading pressure in space 46 can be adjusted as desired.

That end portion of the sleeve 28 which is nearest the outflow passage is provided with means adapted to act as a valve in conjunction with the annular seat 16. An annular groove 56 is formed in the end of the sleeve 28, and is fitted with the resilient O ring 57. The O ring is dimensioned whereby it must be compressed in a radial direction to force it into the groove 56. The base of the groove is provided with a filler washer 58, and is in communication with the outflow passage by way of ducts 59, and the clearance 61. Features of the valve means just described are disclosed and claimed in co-pending application Serial No. 338,287, filed February 24, 1953, which supersedes my application Serial No. 283,555, filed April 25, 1952, now abandoned.

Stationary seat 16 is formed on the inner end of a fitting 60 which provides the outflow passage 12 and which can be threaded into the body. The annular surface 62 formed on the end face of stationary seat 16 is dimensioned whereby when the sleeve is forced downwardly into direct contact with the surface 62, an outer portion of the exposed face of ring 57 is engaged and compressed to establish a seal between the sleeve and the seat 16. With this arrangement it will be evident that a substantial area of the O ring is exposed to the outflow pressure, and the pressure acting upon this area urges the O ring into the groove 56.

The device described above operates as follows: Assuming that the passages 11 and 12 are connected to high and low pressure piping, and that passage 13 communicates directly with the atmosphere, a gas loading pressure is established in space 46 depending upon the pressure which one desires to maintain in the low pressure piping. In normal operation a differential force acts downwardly upon the entire regulator unit, thus urging the sleeve 28 against the seat 16 to maintain a seal between these parts. The piston 17 is acted upon by the outflow pressure applied to its one side (through duct 22 and tube 27), and by the loading pressure applied to its other side. Therefore the piston serves to position the valve member 26 whereby this member is automatically moved with respect to the stationary seating surface 33 to control flow of fluid in such a manner as to maintain a substantially constant outflow pressure.

The piston 17 in conjunction with the barrier 42 and the relatively small space 44 between these parts when the valve is in near closed position, functions in conjunction with the small orifice 47 to restrain the piston to prevent chattering and erratic operation, in the manner disclosed in Grove Patent No. 2,047,101.

In the event the outflow pressure becomes excessive, this pressure acts upwardly upon the regulator unit. At a predetermined outflow pressure value, which is dependent upon the dimensioning of the parts, and the loading pressure, the sleeve 28, together with the other parts carried by the same, moves toward open position with respect to the stationary seat 16, thus permitting outflow pressure to vent through the passage 13. When the outflow pressure has been relieved in this manner, the parts automatically return to normal position, and the sleeve 28 reestablishes sealing engagement with the seat 16.

As mentioned above, the pressure value which causes the relief means to open is in part dependent upon the loading pressure. Thus over a substantial range of adjustment, a change in the loading pressure to change the outflow pressure serves to automatically change the maximum pressure for which the relief means functions. Thus it is not necessary to provide a separate adjustment for setting the relief means.

The regulator unit is proportioned whereby it can be removed from the body by removal of the fitting 60. This facilitates assembly in manufacturing and making repairs.

It will be evident from the foregoing that I have provided a device which can be made quite compact, and which can be constructed of aluminum or other light weight metal or metal alloy. The flow capacity can be relatively high, and the device can be made for use with inflow pressures ranging from 1000 to 3000 p. s. i., or higher. The relief valve means likewise has relatively high capacity for the size of the device, and is adequate to protect the outflow system from excessive pressure.

In the embodiment of the invention just described manual means has been illustrated in the form of needle valves for increasing or decreasing the loading pressure. It will be evident that other means can be employed for this purpose, such as a suitable loading regulator, which if desired can be constructed as an integral part of the device.

I claim:
1. In a fluid flow regulating device, a body having inflow, outflow and venting passages, a pressure reducing regulator assembly unit movably disposed within the body and communicating with the inflow and outflow passages, said unit comprising valve means, a movable piston connected to operate said valve means, a cylinder in which said piston operates, means for applying loading pressure to one side of the piston, and means for applying outflow pressure to the other side of the piston, a vent valve means for venting fluid from the outflow passage through said venting passage when the pressure on the outflow side of the device exceeds a safe value, said means including a valve member carried by the body and a cooperating valve member carried by the regulator unit, and common gas loading means for urging said regulator unit in a direction to move said last named valve members toward closed position with respect to each other and for providing loading for the piston of the pressure reducing regulator unit.

2. A device as in claim 1 in which the cylinder is in the form of a closed dome, with the body having a bore in which the dome is fitted, there being a closed space between the dome and the body adapted to receive the loading gas whereby the pressure of said gas urges the unit in a direction to close the relief valve means.

3. In a fluid flow regulating device, a body having inflow, outflow and venting passages, a pressure reducing regulator assembly unit removably disposed within the body and communicating with the inflow and outflow passages, said unit including a sleeve slidably fitted within a bore provided in the body, means forming a fluid-tight seal between the sleeve and the body, a valve seat carried by the sleeve, a valve member movably carried by the sleeve and cooperating with said seat, said sleeve having inlet and outlet ports communicating through an opening provided through said seat, a closed cylinder carried by the sleeve, a piston secured to the valve member and slidably fitted within the cylinder, means forming a fluid-tight seal between the cylinder and the piston, the space within the cylinder on one side of said piston being in communication with the outlet passage of the body and the space on the other side forming a gas chamber, the body being formed to provide a closed space surrounding the exterior surface of said cylinder whereby gas pressure in said last named space serves to urge the entire pressure reducing regulator unit in one direction, said last named space being in communication with said chamber and said chamber being otherwise closed whereby fluid pressure in said chamber provides loading force for urging said piston in one direction relative to the sleeve and cylinder, a stationary relief valve seat carried by the body and having an opening therethrough serving to interconnect the outflow and vent passages in the body, and a relief valve member cooperating with said relief valve seat and carried by said sleeve, said relief valve member being urged toward open position by fluid pressure in the outflow passage, such movement being against the force of fluid pressure in said last named space.

4. A regulating device as in claim 3 in which said chamber is defined by one annular face of the piston and an opposed annular face formed on the sleeve, the piston being attached to the valve member by a stud disposed to extend centrally through said chamber, and in which sealing means prevents leakage between the stud and that part of the sleeve adjacent said chamber.

5. A regulating device as in claim 4 in which the spacing between said opposed annular faces for closed position of the first named valve member is a small fraction of the travel of the piston between closed and full open positions, and in which communication between the last named space and said chamber is formed by a flow restricting orifice.

References Cited in the file of this patent

UNITED STATES PATENTS

| | | |
|---|---|---|
| 1,145,601 | Lemoine | July 6, 1915 |
| 1,528,297 | Jones | Mar. 3, 1925 |
| 1,723,143 | Farmer | Aug. 6, 1929 |
| 1,725,539 | Riley | Aug. 20, 1929 |
| 2,255,231 | Slater | Sept. 9, 1941 |
| 2,261,364 | Grone | Nov. 4, 1941 |
| 2,522,913 | Westman | Sept. 19, 1950 |